(12) United States Patent
Shimomoto et al.

(10) Patent No.: US 6,915,698 B2
(45) Date of Patent: Jul. 12, 2005

(54) PRESSURE SENSOR, AND ITS MANUFACTURING METHOD

(75) Inventors: Yasushi Shimomoto, Otsu (JP); Kenji Shinohara, Nagaokakyo (JP); Osamu Kishimoto, Tottori (JP); Kazuhira Izawa, Kurayoshi (JP)

(73) Assignee: Omron Corporation, Kyoto (JP)

( * ) Notice: Subject to any disclaimer, the term of this patent is extended or adjusted under 35 U.S.C. 154(b) by 77 days.

(21) Appl. No.: 10/636,478

(22) Filed: Aug. 7, 2003

(65) Prior Publication Data

US 2004/0079161 A1 Apr. 29, 2004

(30) Foreign Application Priority Data

Aug. 7, 2002  (JP) ........................................ 2002-230248

(51) Int. Cl.[7] ................................................. G01L 9/00
(52) U.S. Cl. ............................ 73/717; 73/700; 73/715; 73/753
(58) Field of Search ................................... 73/700–756

(56) References Cited

FOREIGN PATENT DOCUMENTS

JP          7-286925         10/1995     ............. G01L/9/12

OTHER PUBLICATIONS

Patent Abstracts of Japan, Publication No. 07–286925 dated Oct. 31, 1995 (2 pgs.).

*Primary Examiner*—Edward Lefkowitz
*Assistant Examiner*—Jermaine Jenkins
(74) *Attorney, Agent, or Firm*—Osha & May L.L.P.

(57) ABSTRACT

A small-sized pressure sensor having smaller numbers of parts and assembling steps, a simple structure, a high assembly precision, and little dispersion in the operation characteristics, and a method for manufacturing the pressure sensor. The pressure sensor comprises: a base member; a stationary electrode molded so integrally as is exposed from the bottom face of a recess formed in the upper face of the base member; moving electrode receiving portions and molded so integrally in the bottom face of the recess of the base members as are arranged in the periphery of the stationary electrode and as are higher by a predetermined inter-electrode gap than the upper face of the stationary electrode; a moving electrode opposed to the upper face of the stationary electrode through a predetermined inter-electrode gap; and a diaphragm fixed of the open edge portion of the recess of the base member and adhered integrally at the central portion of its lower face to the upper face of the moving electrode.

5 Claims, 11 Drawing Sheets

PRESSURE SENSOR, AND ITS MANUFACTURING METHOD

BACKGROUND OF THE INVENTION

1. Field of the Invention

The present invention relates to a pressure sensor and, more particularly, to an electrostatic capacity type pressure sensor to be packaged in an industrial device.

2. Description of the Related Art

As the electrostatic capacity type pressure sensor to be packaged in the industrial device of the prior art, there is a pressure sensor (as referred to Patent Publication 1), which comprises: a pressure receiving unit having a pressure receiving portion for sensing the pressure of a pressure fluid; a sensor unit having a sensor portion including stationary electrodes, and a moving electrode made movable in response to the pressure sensed by the pressure receiving unit and insulated and held between the stationary electrodes; and a signal processing unit having a reference portion and processing the electrostatic capacities of the sensor portion and the reference portion for outputting a desired signal.

[Patent Publication 1]

JP-A-7-286925 (pages 5 to 8, FIG. 1 and FIG. 2)

However, the pressure sensor of the prior art has a large number of parts and a complicated structure so that it has a large number of assembling steps and is difficult to reduce the size. Moreover, an accumulated error is so high as to make it difficult to retain a high assembling precision. This raises a problem that the dispersion of the operating characteristics is high.

SUMMARY OF THE INVENTION

In view of the aforementioned problem, the present invention has an object to provide a small-sized pressure sensor having smaller numbers of parts and assembling steps, a simple structure, a high assembly precision, and little dispersion in the operating characteristics, and a method for manufacturing the pressure sensor.

In order to achieve that object, according to the invention, there is provided a pressure sensor comprising: a base member; a stationary electrode molded so integrally as is exposed from the bottom face of a recess formed in the upper face of the base member; moving electrode receiving portions molded so integrally in the bottom face of the recess of the base member as are arranged in the periphery of the stationary electrode and as are higher by a predetermined inter-electrode gap than the upper face of the stationary electrode; a moving electrode integrated with the moving electrode receiving portion by placing on outer circumferential edge portion of the moving electrode on the moving electrode receiving portion, and opposed to the upper face of the stationary electrode through a predetermined inter-electrode gap; and a diaphragm fixed on the open edge portion of the recess of the base member and adhered integrally at the central portion of its lower face to the upper face of the moving electrode.

According to an aspect of the invention, therefore, the upper face of the stationary electrode molded integrally with the base member and the upper faces of the moving electrode receiving portions are arranged to have the predetermined inter-electrode gap. Therefore, the outer circumferential edge portion of the moving electrode is mounted on and assembled integrally with the moving electrode receiving portions. It is, therefore, possible to provide the small-sized pressure sensor, which not only has the small numbers of parts and assembling steps and the simple structure but also can assemble the moving electrode in the high assembly precision on the base member so that it has the little dispersion in the operating characteristics.

In an embodiment of the invention, moreover, the pressure sensor may further comprise a shield cover having such an outer circumferential shape as can be fitted on the base member and having a through hole in its outer face for inspecting the diaphragm visually, so that it clamps and fixes the outer circumferential edge portion of the diaphragm between an annular step portion formed at its outer circumference and the upper edge portion of the base member.

According to this embodiment, therefore, the shield cover removes electrostatic disturbances or the like so that it provides a highly reliable pressure sensor. Moreover, the diaphragm is protected by the shield cover because it is less attacked by scattered objects. By handling the shield cover manually, still moreover, the thin and fragile diaphragm need not be touched to enhance the workability.

In another embodiment, moreover, the shield cover may be vertically divided into a shield portion and a fitting portion, and the outer circumferential edge portion of the diaphragm may be clamped between the lower open edge portion of the shield portion and the upper open edge portion of the fitting portion. The shield cover and the diaphragm may be irradiated sideway with a laser beam so that they are integrally welded.

According to this embodiment, the outer circumferential edge portion of the diaphragm is welded integrally with the outer circumferential edge portion of the disc while being clamped between the outer circumferential edge portion of the disc and the step portion of the shield cover. Therefore, the thermal shrinkage after the welding operation is suppressed to reduce the thermal stress to the diaphragm thereby to reduce the dispersion of the operating characteristics.

In another embodiment, moreover, the shield cover may be vertically divided into a shield portion and a fitting portion and ribs bent up from the outer circumferential edge portion of the diaphragm may be clamped between the lower open edge portion of the shield portion and ribs formed at the upper open edge portion of the fitting portion. The lower open edge portion of the shield portion of the shield cover, the ribs of the fitting portion and the ribs of the diaphragm may be integrally welded by irradiating the ribs of the diaphragm with a laser beam.

According to this embodiment, the bent ribs of the diaphragm are clamped between the shield portion of the shield cover and the ribs of the fitting portion and are integrally welded. Therefore, the thermal stress exerts, it any generated by the welding operation, little adverse influence directly to the diaphragm body, thereby to provide the pressure sensor having less dispersion in the operating characteristics.

According to another aspect of the invention, there is provided a method for manufacturing a pressure sensor, in which a stationary electrode and moving electrode receiving portions are molded integrally with a base member. The stationary electrode arranged on the bottom face of a recess of the base member and the moving electrode receiving portions are so positioned in a mold as to form a predetermined inter-electrode gap between the upper face of the stationary electrode and the upper faces of the moving electrode receiving portions. A resin is then poured and set to mold the stationary electrode and the moving electrode receiving portions integrally.

According to this manufacture method of the invention, the upper face of the stationary electrode and the upper faces of the moving electrode receiving portions are positioned and integrally molded with the base member by the mold. Therefore, the stationary electrode and the moving electrode receiving portions can be positioned in a remarkably high positioning precision. As a result, even if the moving electrode is assembled with the moving electrode receiving portions, the stationary electrode and the moving electrode have a drastically high sizing precision in the inter-electrode gap so that the operating characteristics are homogenized.

According to still another aspect of the invention, there is provided a method for manufacturing a pressure sensor, in which the outer circumferential edge portion of a diaphragm assembled with a shield cover is welded integrally with the shield cover. The outer circumferential edge portion of the diaphragm assembled with the shield cover is irradiated simultaneously with a plurality of laser beams arranged at an equal pitch so that the shield cover and the diaphragm are integrally molded.

According to this manufacture method of the invention, the thermal stress, as generated at the welding time with the laser beams, is dispersed homogeneously but not partially heterogeneously. Therefore, an effect is obtained to provide a method for manufacturing a pressure sensor having little dispersion in the operating characteristics.

DESCRIPTION OF THE PREFERRED EMBODIMENTS

Figure 1A:
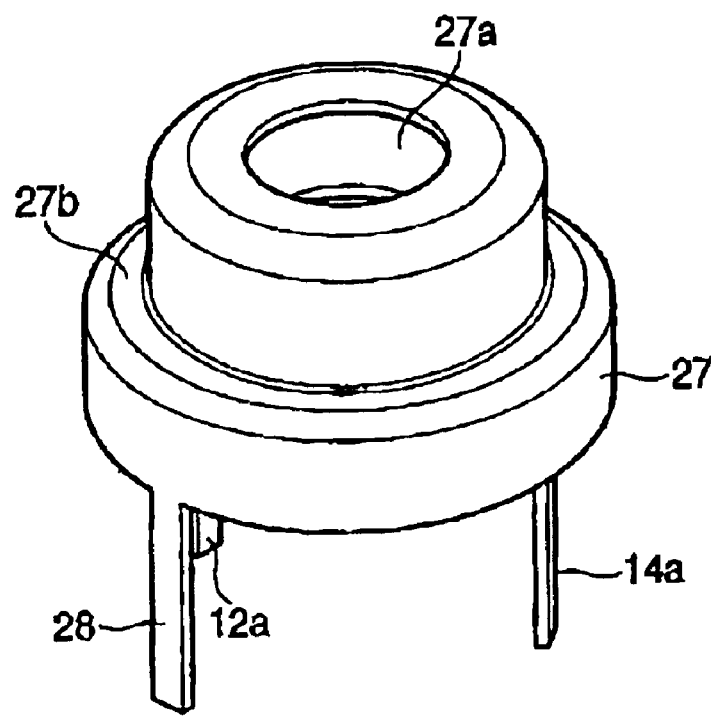
FIG. 1A and FIG. 1B are perspective views showing a pressure sensor according to one embodiment of the invention.
Figure 1B:
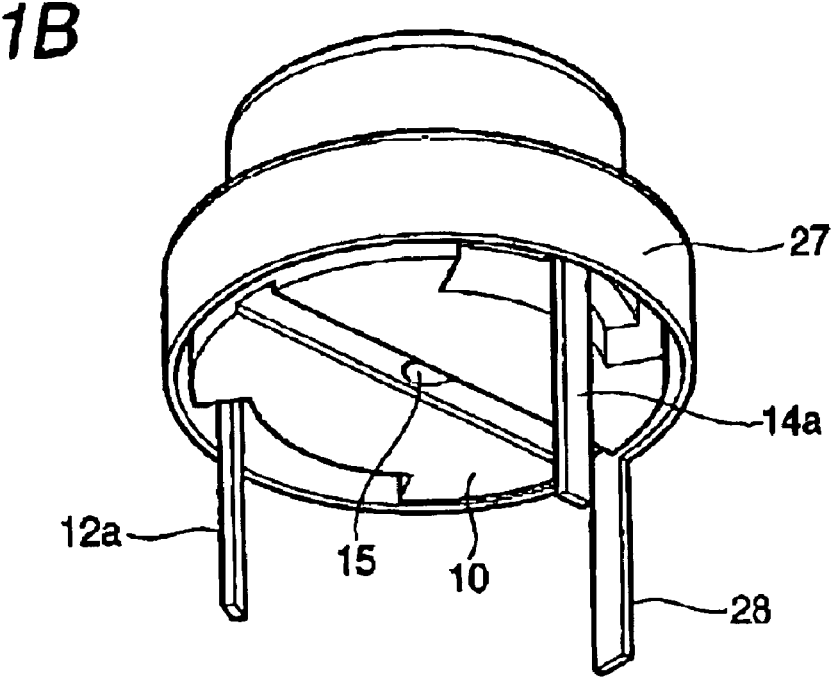
Figure 2A:
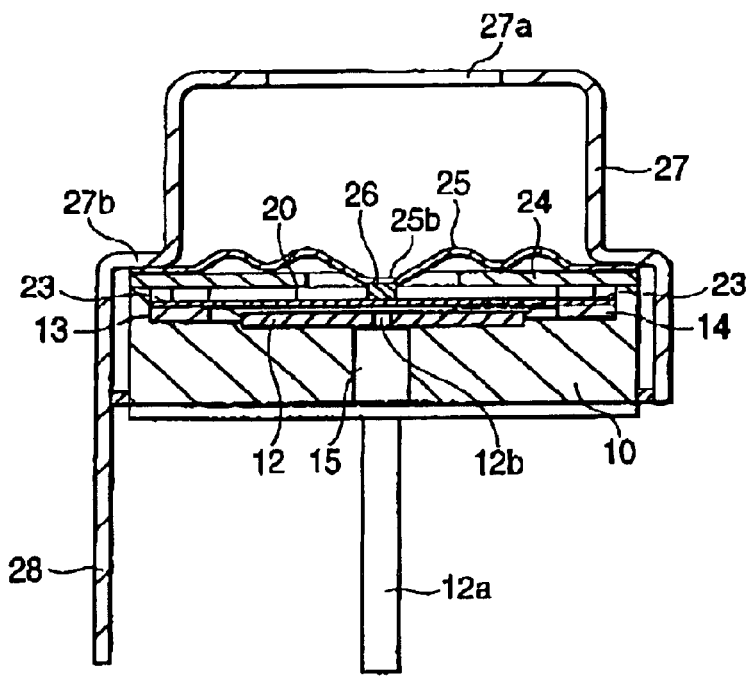
FIG. 2A and FIG. 2B are longitudinal sections showing the pressure sensor of FIGS. 1A and 1B and taken from a different position.
Figure 2B:
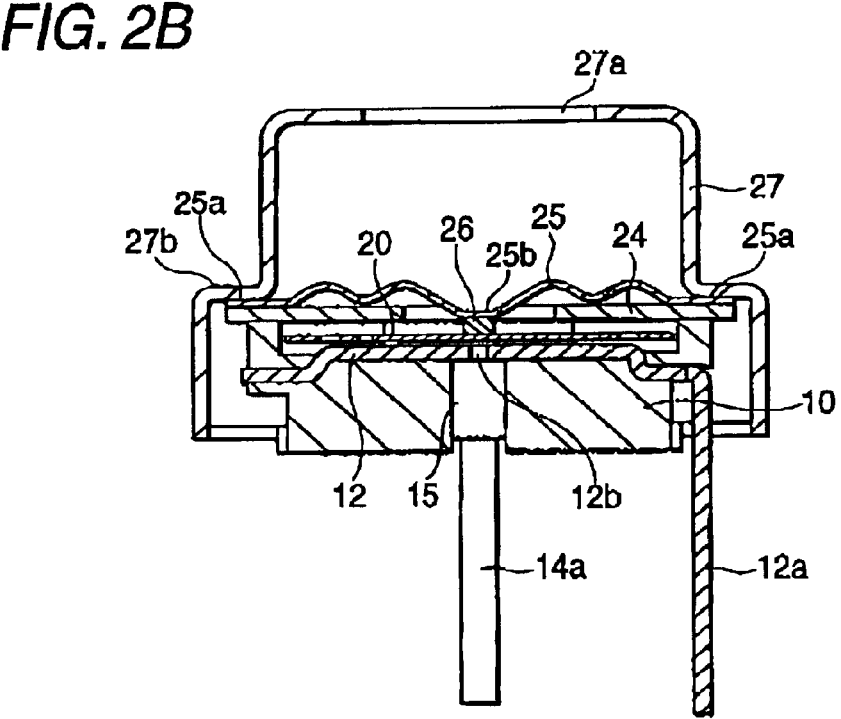

An embodiment of the pressure sensor according to the invention will be described with reference to FIG. 1 to FIG. 12.

In the first embodiment, as shown in FIG. 1 to FIG. 9, a moving electrode 20, a disc 24 and a diaphragm 25 are assembled with a base member 10, and a shield cover 27 is integrally fitted on the base member 10.

The base member 10 is insert-molded not only with a disc-shaped stationary electrode 12 into the bottom center of its recess 11 but also with moving electrode receiving portions 13 and 14, as will be described hereinafter, at positions opposed across the stationary electrode 12. Between the upper face of the stationary electrode 12 and the upper faces of the receiving portions 13 and 14, there are formed steps for inter-electrode gaps, as apparent from FIGS. 4B and 4C. Moreover, the stationary electrode 12 is provided with an air hole 12b at its center and has a terminal 12a extending therefrom. On the other hand, the moving electrode receiving portion 14 also has a terminal 14a extending therefrom.

Here, the moving electrode receiving portions 13 and 14 may be formed into a C-shape or an annular shape by integrating them.

Figure 3:
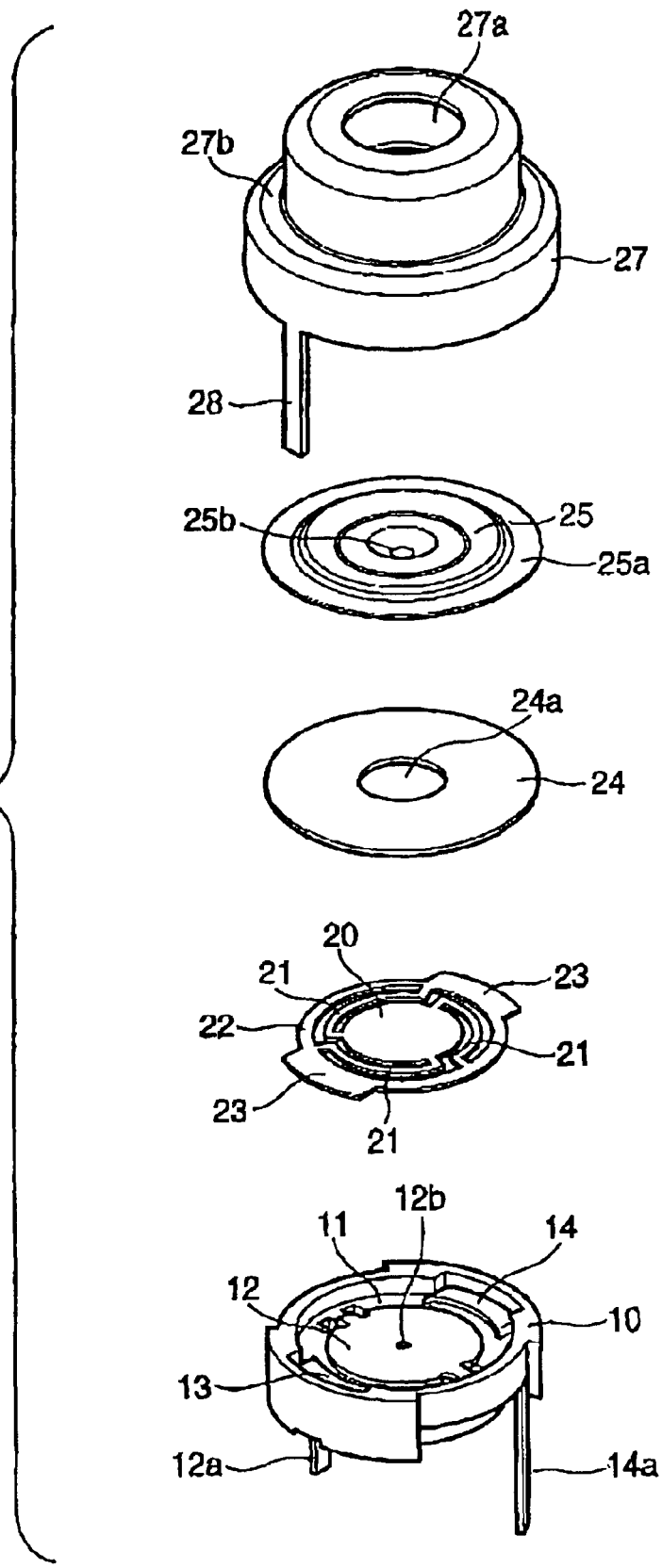
FIG. 3 is an exploded perspective view of the pressure sensor of FIGS. 1A and 1B.

AS shown in FIG. 3, the moving electrode 20 is connected to an annular support frame 22 through three elastic arm portions 21 equally extending from its outer circumferential edge portion to have a C-shape generally in a top plan view. A pair of positioning tongues 23 are extended to the opposed positions of the outer circumferential edge portion of the support frame 22.

The disc 24 is made of a sheet-shaped conductive material such as SUS and has a through hole 24a at its center as shown in FIG. 3. This disc 24 has functions to prevent the leakage from the diaphragm 25, as might otherwise be caused by a welding miss, thereby to keep the gas-tightness, and to prevent the diaphragm 25 from being broken by an excessive displacement. However, the disc 24 is not an essential part but may be provided, if necessary.

As shown in FIG. 3, the diaphragm 25 is formed into a flat circle shape having an outer circumferential edge portion 25a and a central portion 25b formed flat and, between which a corrugated concentric face is formed. Here, the sizes of the outer circumferential edge portion 25a and the central portion 25b can be changed, when needed.

As shown in FIG. 3, the shield cover 27 has such an outer circumferential shape as can be fitted on the base member 10, and is provided with a through hole 27a in the central portion of its ceiling face and an annular step portion 27b at its outer circumferential portion.

The shield cover 27 clamps, when assembled with the base member 10, the outer circumferential edge portion of the disc 24 and the outer circumferential edge portion 25a of the diaphragm 25 between itself and the open edge portion of the base member 10. Here, the shield cover 27 excepting a terminal 28 has external sizes of a diameter of 7 mm at the maximum and a height of 4.8 mm.

Here will be described a method for assembling the pressure sensor according to this embodiment.

Figure 4A:
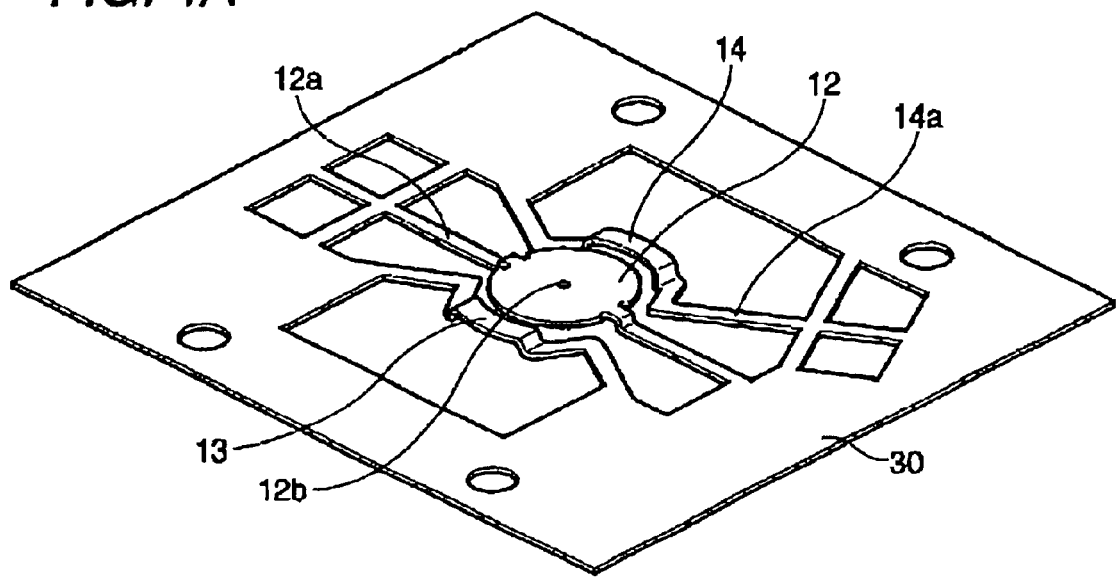
FIG. 4A is a perspective view of a lead frame for forming stationary electrode and moving electrode receiving portions of a base of FIG. 3, and FIG. 4B and FIG. 4C are sectional views of FIG. 4A taken from different positions.
Figure 4B:
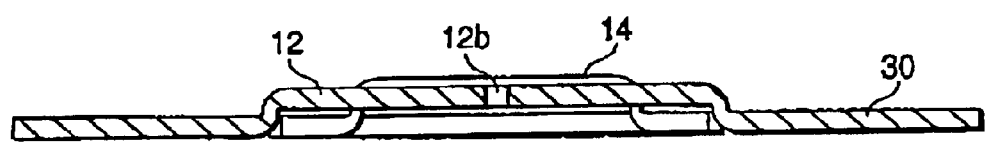
Figure 4C:
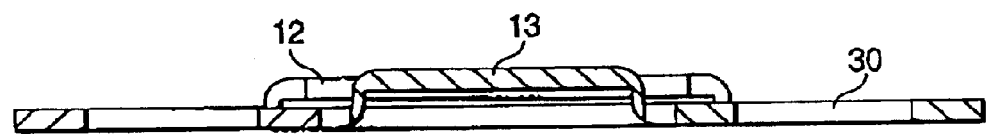

First of all, as shown in FIG. 4, the stationary electrode 12 and the receiving portions 13 and 14 are pressed and punched out of a lead frame 30. At this time, the steps for the inter-electrode gaps are formed between the upper face of the stationary electrode 12 and the upper faces of the receiving portions 13 and 14.

Figure 5A:
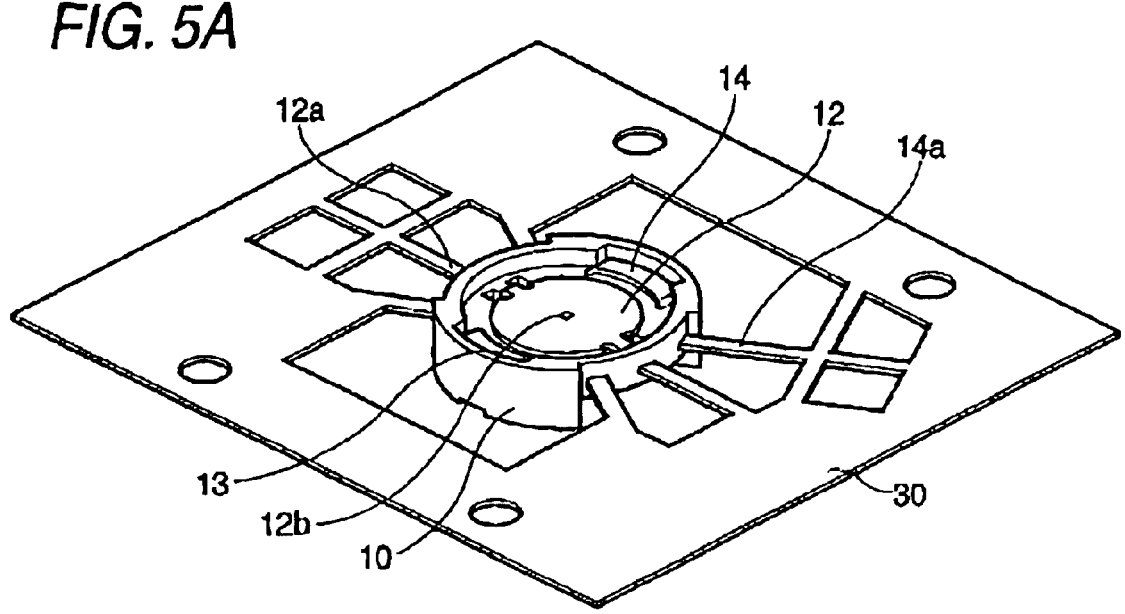
FIG. 5A is a perspective view showing the case, in which the lead frame of FIG. 4A is insert-molded.
Figure 5B:
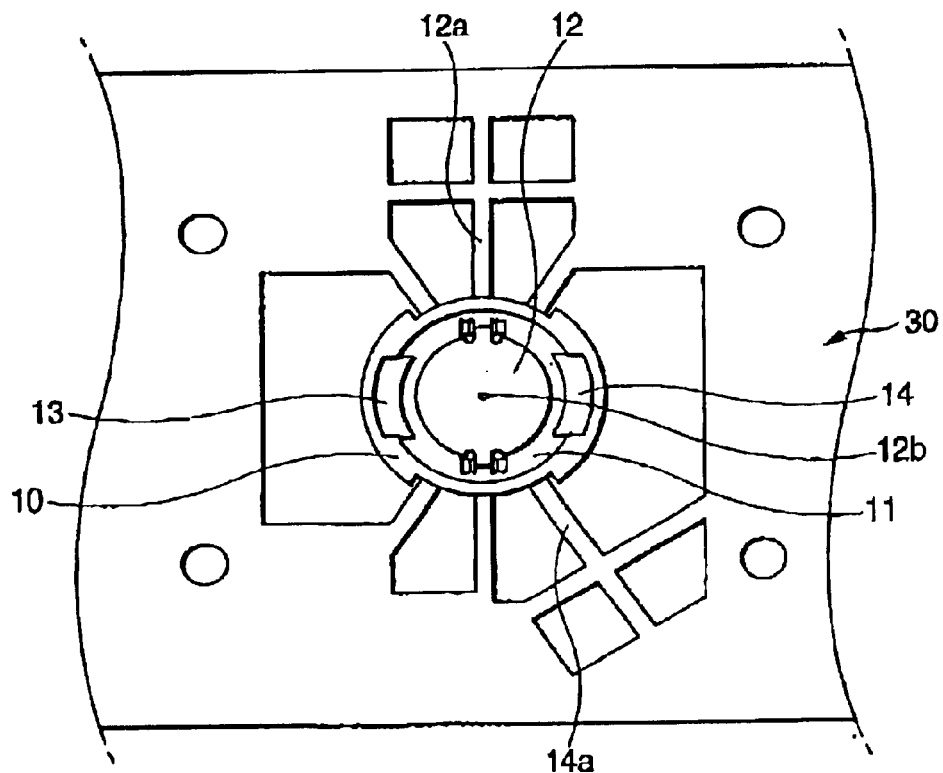
FIG. 5B is a top plan view of FIG. 5A.
Figure 6:
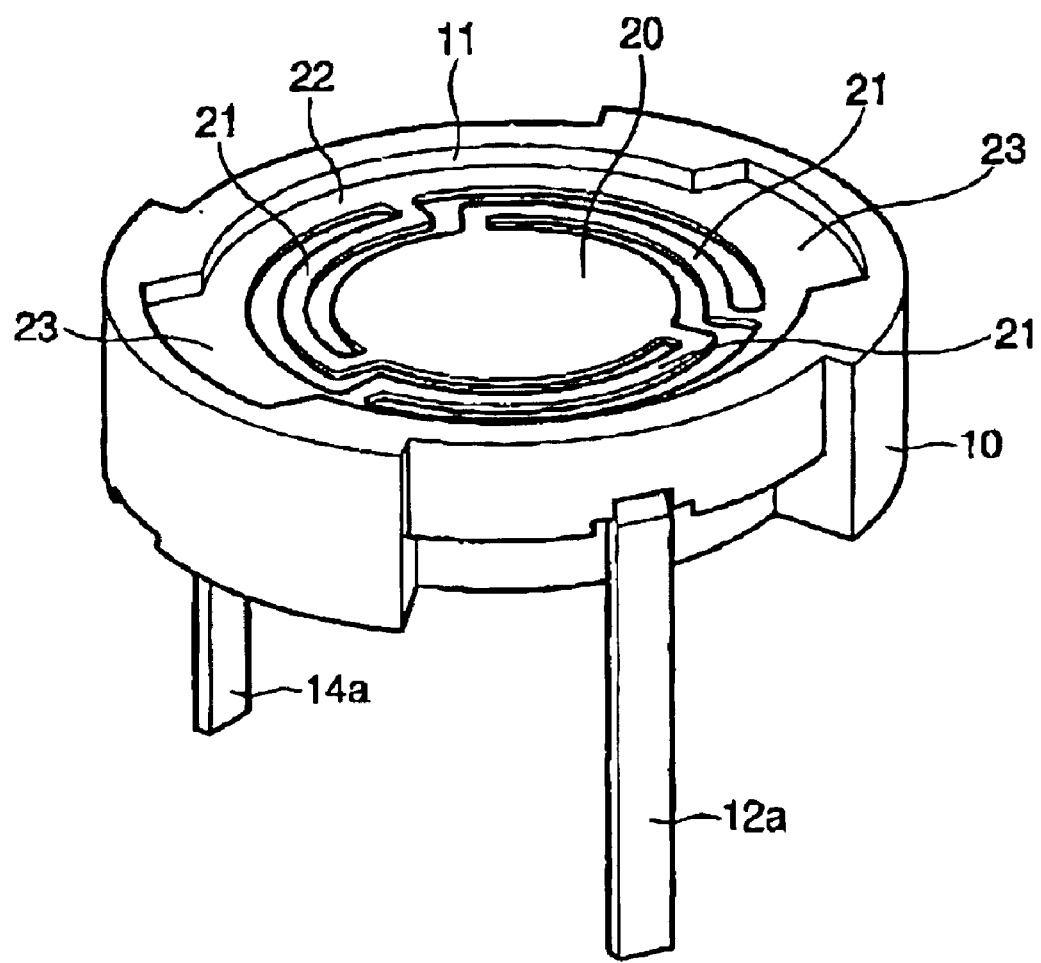
FIG. 6 is a perspective view showing the state, in which the moving electrode is assembled with a base member.

Next, the upper face of the stationary electrode 12 and the upper faces of the receiving portions 13 and 14 are positioned with the not-shown mold and are then insert-molded (as referred to FIG. 5). And, the moving electrode 20 is fitted in the recess 11 of the base member 10, and its positioning tongues 23 and 23 are positioned in the moving electrode receiving portions 13 and 14. The positioning tongues 23 and 23 are irradiated with a laser beam so that they are welded integrally with the receiving portions 13 and 14. And, the base member 10 is cut out of the lead frame 30, and the terminals 12a and 14a are then bent down so that the base member 10 integrated with the moving electrode 20 is obtained (FIG. 6).

In this embodiment, the steps between the upper face of the stationary electrode 12 and the upper faces of the receiving portions 13 and 14 provide the electrode gaps. And, the upper face of the stationary electrode 12 and the upper faces of the receiving portions 13 and 14 are positioned with the not-shown mold and are then insert-molded. Therefore, this embodiment is advantageous in that it can be simply assembled in a high assembly precision merely by placing the positioning tongues 23 and 23 of the moving electrode 20 on the receiving portions 13 and 14 and by welding the positioning tongues 23 and 23 integrally with the receiving portions 13 and 14.

Figure 8A:
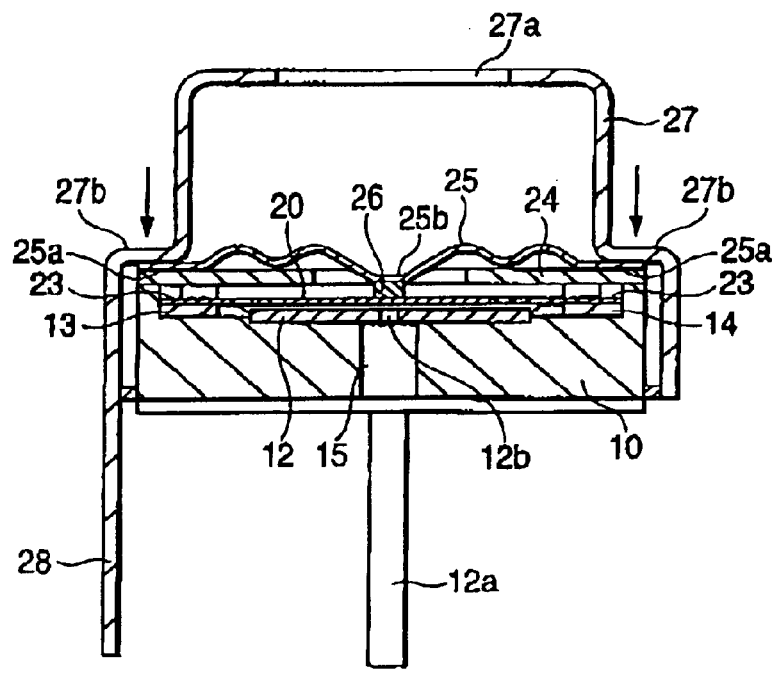
FIGS. 8A and 8B are sectional views showing a method for welding the pressure sensor of the first embodiment to a shield cover.

On the other hand, the diaphragm 25 and the disc 24 are fitted and positioned in the inner side of the shield cover 27. After this, the laser beam is applied from the annular step portion 27b of the shield cover 27 to the outer circumferential edge portion of the disc 24, as shown in FIG. 8A, to weld the diaphragm 25 and the disc 24 in advance integrally with the shield cover 27.

For convenience of description, here is presented a sectional view of the state, in which the base member 10 is assembled with the shield cover 27. It is, however, possible to select arbitrarily, if necessary, that the shield cover 27, the diaphragm 25 and the disc 24 are integrally welded in advance and are then assembled with the base member 10. This selection can also be applied to another welding method, as will be described hereinbefore (FIG. 8A, FIG. 9A and FIG. 9B).

Next, the shield cover 27 is turned upside-down and positioned, and an adhesive 26 is then dropped to the central portion 25b of the diaphragm 25. And, the base 10 is press-fitted and temporarily fixed in the shield cover 27. Moreover, a (not-shown) sealing medium is injected into the clearance between the shield cover 27 and the base member 10. And, the adhesive 26 and the sealing medium are heated at a predetermined temperature so that they are set to adhere the diaphragm 25 and the moving electrode 20 integrally and to adhere and seal the shield cover 27 and the base member 10 integrally. Thus, the assembling work is completed.

Figure 8B:
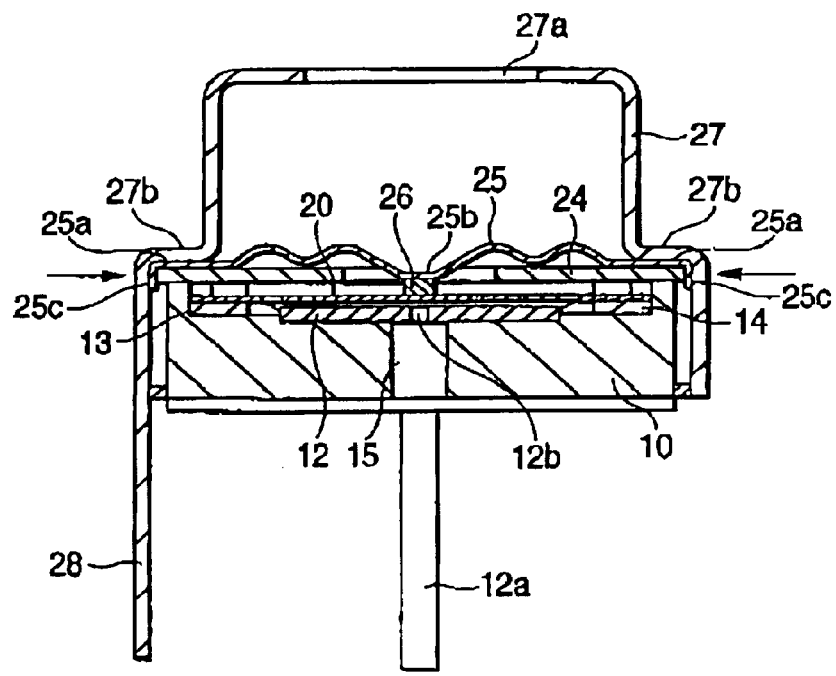

Here, a method for welding the diaphragm 25 and the disc 24 integrally to the shield cover 27 is exemplified by that shown in FIG. 8B, in which ribs 25c formed by bending down the outer circumferential edge portion of the diaphragm 25 are clamped between the side end face of the disc 24 and the side wall of the shield cover 27. And, the laser beam may be applied sideway of the outer side face of the shield cover 27 to weld the shield cover 27, the diaphragm 25 and the disc 24 integrally.

Figure 9A:
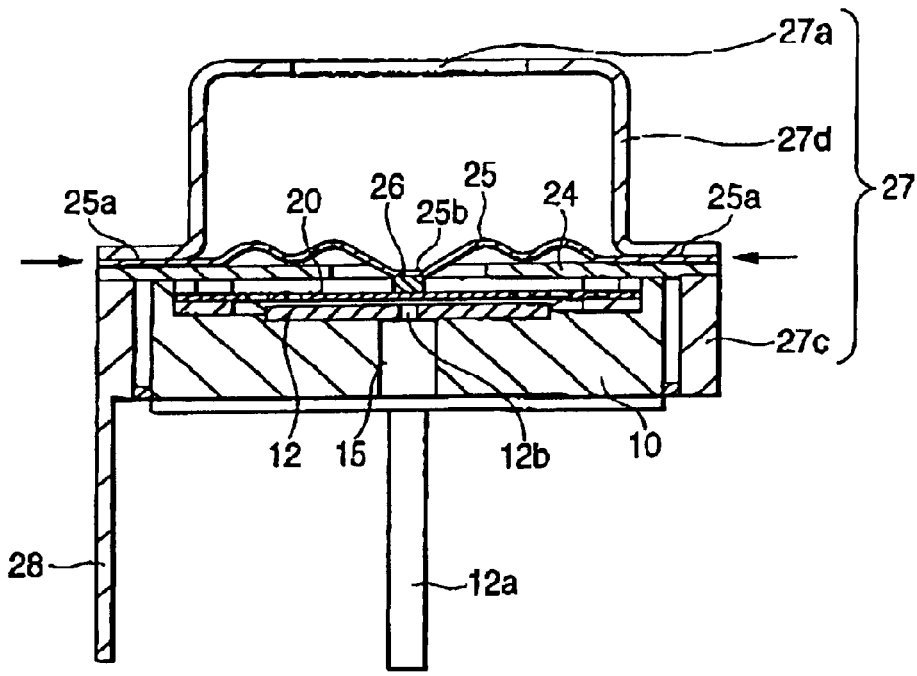
FIGS. 9A and 9B are sectional views showing another method for welding the pressure sensor of the first embodiment to the shield cover.
Figure 9B:
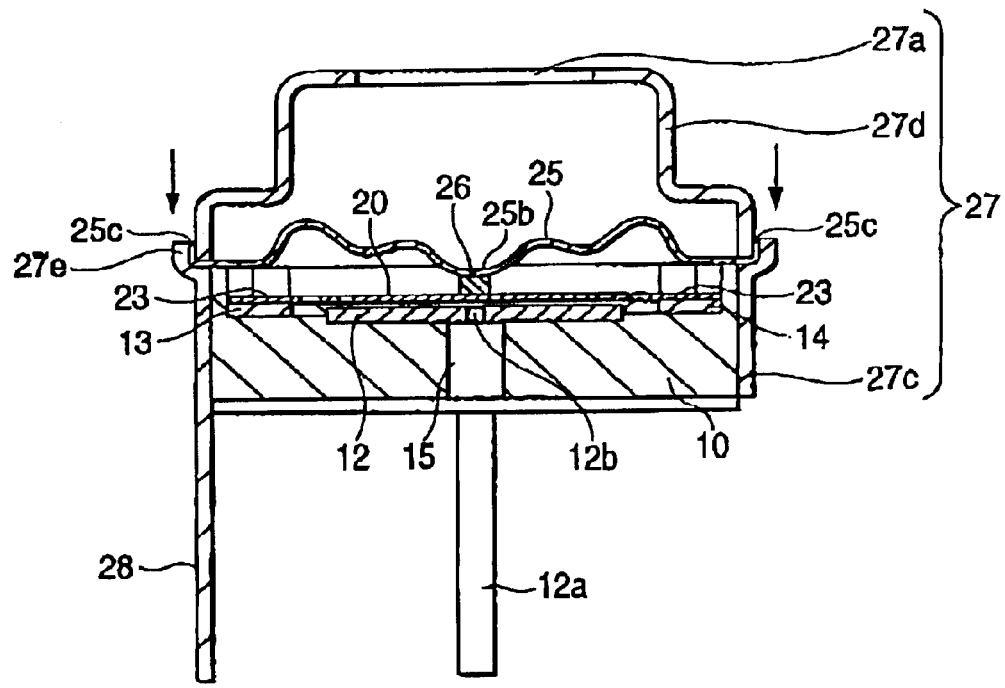

Moreover, the shield cover 27 need not be integral at all times but may be vertically divided into a fitting portion 27c and a shield portion 27d, as shown in FIG. 9A. And, the upper open edge portion of the fitting portion 27c and the lower open edge portion of the shield portion 27d may clamp the outer circumferential edge portion 25a of the diaphragm 25 and the outer circumferential edge portion of the disc 24 and may be integrally welded by applying the laser beam from the side.

As shown in FIG. 9B, moreover, the open edge portion of the fitting portion 27c of the shield cover 27 is pressed to form ribs 27e. On the other hand, the circumferential edge portion of the diaphragm 25 is bent up to form the ribs 25c. And, the ribs 25c of the diaphragm 25 are positioned in the ribs 27e of the fitting portion 27c, and the open edge portion of the shield portion 27d is stacked. Next, the laser beam is applied downward to the ribs 27e of the fitting portion 27c thereby to weld the shield cover 27 and the diaphragm 25 integrally. This welding method is advantageous in that the thermal shrinkage after the laser welding treatment acts on the ribs 25c of the diaphragm 25 but exerts no bad influence on the operating characteristics of the diaphragm 25.

Here will be described the actions of the pressure sensor thus constructed.

Figure 7:
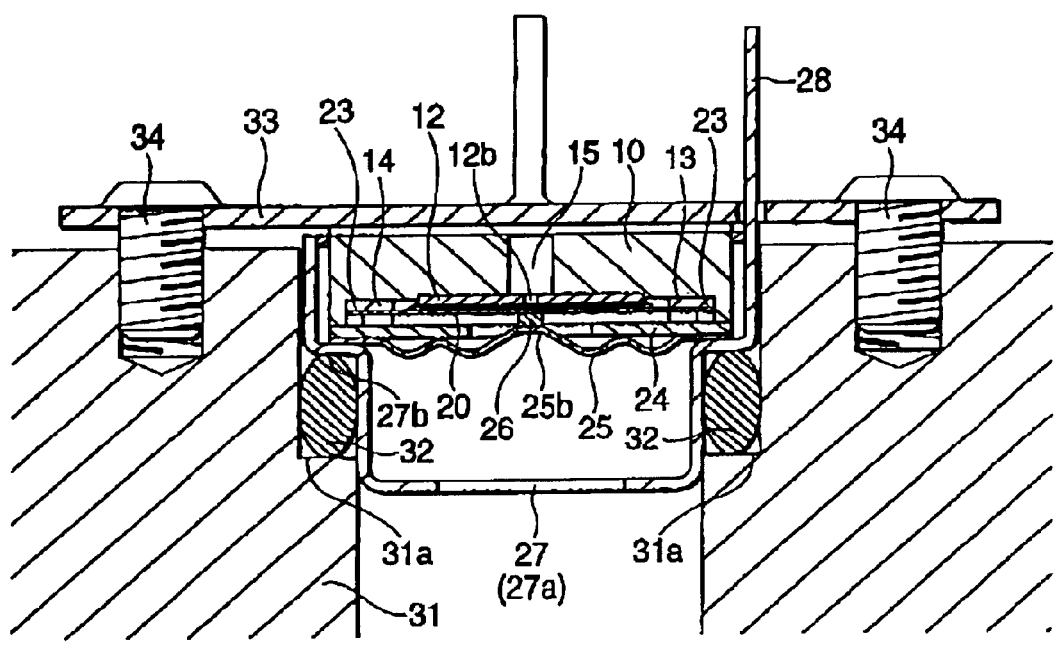
FIG. 7 is a sectional view showing the used state of the pressure sensor shown in FIGS. 1A and 1B.

First of all, the pressure sensor, as mounted on and soldered to a mounting substrate 33, is fitted on a step portion 31a of a measurement bed 31 through a sealing ring 32 as shown in FIG. 7. And, the mounting substrate 33 is fixed on the measurement bed 31 by means of screws 34 thereby to deform the seal ring 32 elastically. Thus, the mounting operations are completed.

In case the pressures on the front and back sides of the diaphragm 25 are balanced, moreover, the moving electrode 20 is opposed at a predetermined spacing to the stationary electrode 12. When the external pressure of the shield cover 27 drops, the diaphragm 25 expands, and the moving electrode 20 leaves the stationary electrode 12 to decrease the electrostatic capacity, so that the drop of the external pressure can be detected. When the external pressure rises, on the other hand, the diaphragm 25 is pushed in, and the moving electrode 20 approaches the stationary electrode 12 to increase the electrostatic capacity, so that the rise of the external pressure can be detected.

Figure 10:
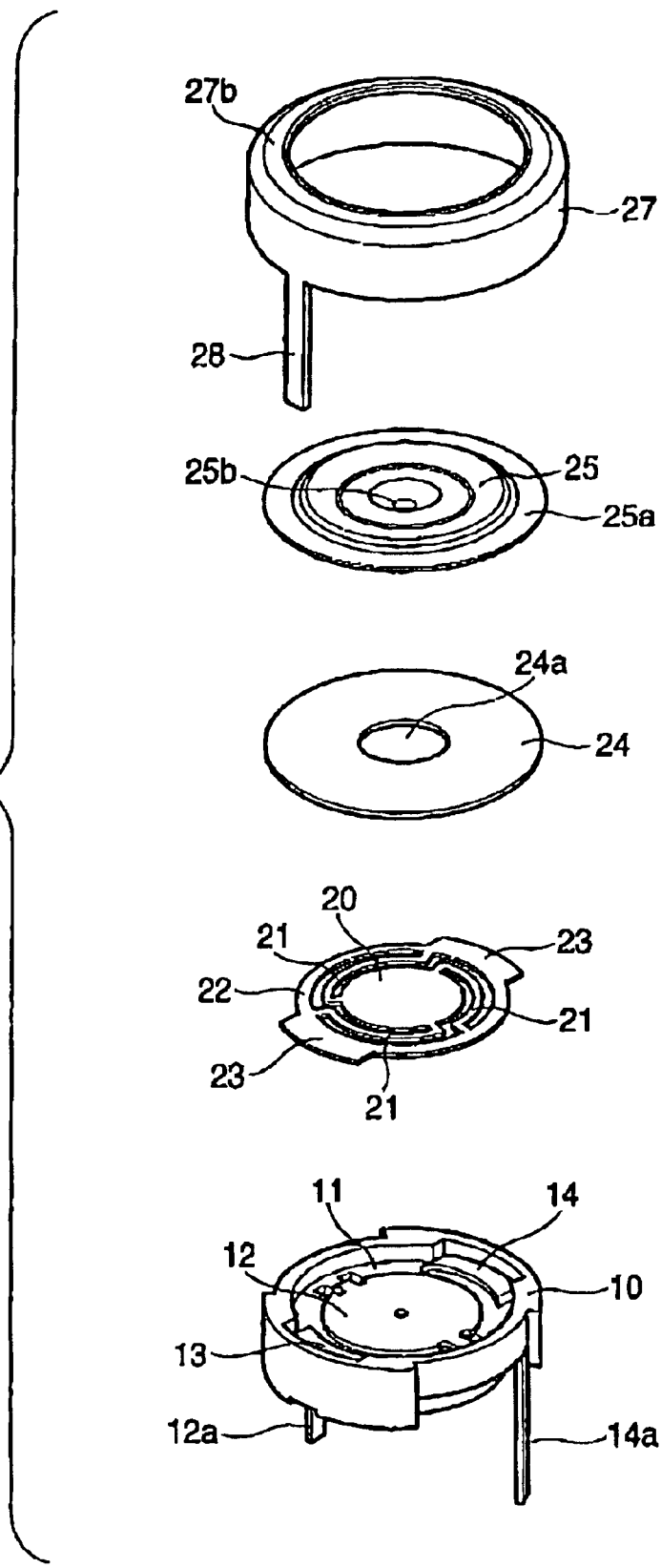
FIG. 10 is an exploded perspective view showing a pressure sensor according to a second embodiment of the invention.
Figure 11A:
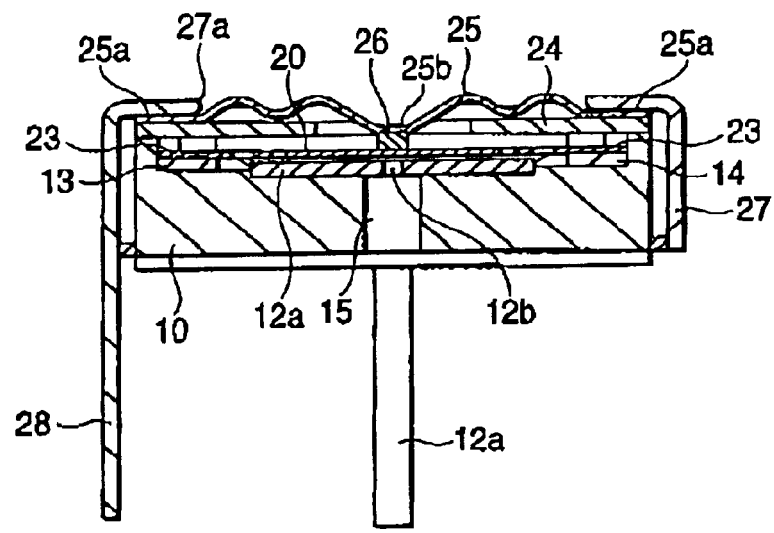
FIG. 11A is a longitudinal section of the pressure sensor of FIG. 10.

A second embodiment is substantially similar to the foregoing first embodiment, as shown in FIG. 10 and FIG. 11. What is different is that the shield cover 27 is not provided with the shield portion 27d. The common portions will be omitted in their description by designating them by the common reference numerals.

Figure 11B:
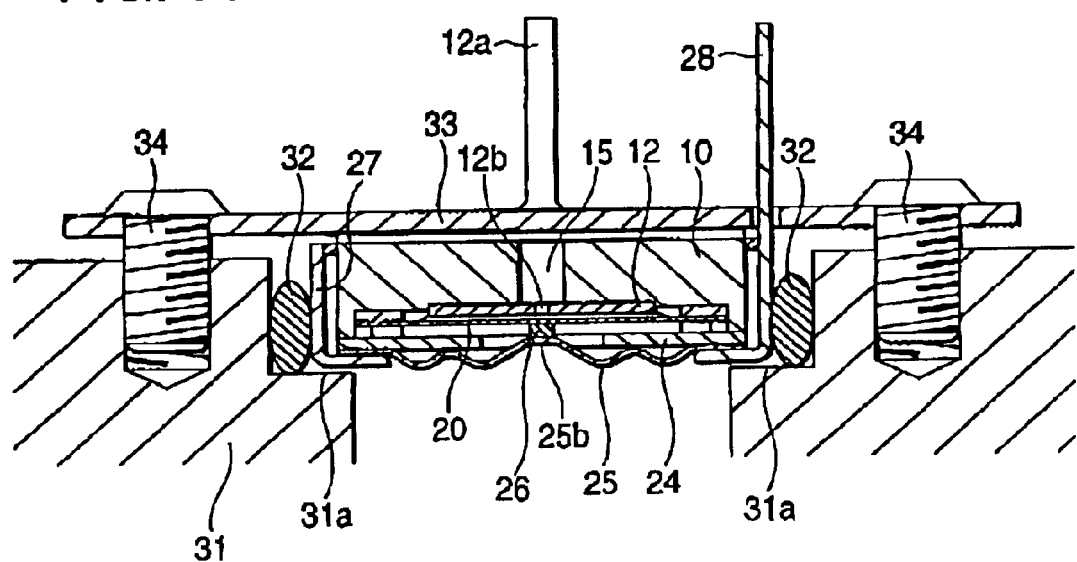
FIG. 11B is a sectional view showing the used state.

First of all, the pressure sensor, as mounted on and soldered to the mounting substrate, is fitted on the step portion 31a of the measurement bed 31 through the sealing ring 32 as shown in FIG. 11B. And, the mounting substrate 33 is fixed on the measurement bed 31 by the screws 34 thereby to deform the seal ring 32 elastically. Thus, the mounting operations are completed. The remaining operations are omitted in their description because they are substantially similar to those of the first embodiment.

Here, the diaphragm 25 should not be limited to the aforementioned shape but may be modified such that it is not provided with the corrugated concentric face around the central portion 25b.

Moreover, the foregoing embodiments have been described on the case, in which the base member 10 and the stationary electrode 12 are provided with a vent hole 15 and the air hole 12b, which communicate with the outside environment. However, the inside space formed between the base member 10 and the diaphragm 25 is closed to form a reference pressure chamber so that the absolute pressure of the gas or liquid may be measured. At this time, the inside space between the base member 10 and the diaphragm 25 may be filled and closed with the gas or liquid. If the closed inside space is filled with a liquid such as silicone oil, for example, it is advantageous in that the measuring precision is higher, because the liquid is less subject to the influences of the temperature than the gas so that it is hardly disturbed by the temperature change.

According to the pressure sensor of the invention, the upper face of the stationary electrode molded integrally with the base member and the upper faces of the moving electrode receiving portions are arranged to have the predetermined inter-electrode gaps. Therefore, the outer circumferential edge portion of the moving electrode is placed on and assembled integrally with the moving electrode receiving portions. Therefore, the pressure sensor not only has smaller numbers of parts and assembling steps and a simple structure but also can assemble the moving electrode with the base member in a high precision. Thus, there is an effect that it is possible to provide a small-sized pressure sensor having little dispersion in the operating characteristics.

What is claimed is:

1. A pressure sensor comprising: a base member; a stationary electrode molded so integrally as is exposed from the bottom face of a recess formed in the upper face of said base member; moving electrode receiving portions molded so integrally in the bottom face of the recess of said base member as are arranged in the periphery of said stationary electrode and as are higher by a predetermined inter-electrode gap than the upper face of said stationary electrode; a moving electrode integrated with said moving electrode receiving portion by placing an outer circumferential edge portion of said moving electrode on said moving electrode receiving portion, and opposed to the upper face of said stationary electrode through a predetermined inter-electrode gap; and a diaphragm fixed on the open edge portion of the recess of said base member and adhered integrally at the central portion of its lower face to the upper face of said moving electrode.

2. A pressure sensor according to claim 1, further comprising a shield cover having such an outer circumferential shape as can be fitted on said base member and having a through hole in its outer face for inspecting said diaphragm visually, so that it clamps and fixes the outer circumferential edge portion of said diaphragm between an annular step portion formed at its outer circumference and the upper edge portion of said base member.

3. A pressure sensor according to claim 2,
wherein the outer circumferential edge portion of said diaphragm is clamped and fixed between the step portion of said shield cover and the outer circumferential edge portion of a disc having a through hole at its center and made of a sheet-shaped conductive material positioned at the open edge portion of said base member.

4. A pressure sensor according to claim 2,
wherein said shield cover is vertically divided into a shield portion and a fitting portion, wherein the outer circumferential edge portion of said diaphragm is clamped between the lower open edge portion of said shield portion and the upper open edge portion of said fitting portion, and wherein said shield cover and said diaphragm are irradiated sideway with a laser beam so that they are integrally welded.

5. A pressure sensor according to claim 2,
wherein said shield cover is vertically divided into a shield portion and a fitting portion, wherein ribs bent up from the outer circumferential edge portion of said diaphragm are clamped between the lower open edge portion of said shield portion and ribs formed at the upper open edge portion of said fitting portion, and wherein the lower open edge portion of the shield portion of said shield cover, the ribs of said fitting portion and the ribs of said diaphragm are integrally welded by irradiating the ribs of said diaphragm with a laser beam.

* * * * *